(12) United States Patent
Finke et al.

(10) Patent No.: US 6,793,486 B2
(45) Date of Patent: *Sep. 21, 2004

(54) BURNER FOR NON-SYMMETRICAL COMBUSTION AND METHOD

(75) Inventors: Harry P. Finke, Pittsburgh, PA (US); Gregory T. Kitko, Pittsburgh, PA (US); Marty R. McGhee, Pittsburgh, PA (US); David G. Schalles, Pittsburgh, PA (US)

(73) Assignee: Bloom Engineering Company, Inc., Pittsburgh, PA (US)

( * ) Notice: Subject to any disclaimer, the term of this patent is extended or adjusted under 35 U.S.C. 154(b) by 51 days.

This patent is subject to a terminal disclaimer.

(21) Appl. No.: 10/032,803

(22) Filed: Dec. 28, 2001

(65) Prior Publication Data

US 2003/0008255 A1 Jan. 9, 2003

(Under 37 CFR 1.47)

Related U.S. Application Data

(63) Continuation-in-part of application No. 09/744,845, filed on Aug. 29, 2001, now Pat. No. 6,471,508.
(60) Provisional application No. 60/094,607, filed on Jul. 30, 1998.

(51) Int. Cl.[7] .............................. F23C 3/00; F23D 14/12
(52) U.S. Cl. ........................ 431/215; 431/11; 431/353; 431/180; 431/182; 431/10
(58) Field of Search ................................ 431/215, 8, 9, 431/10, 11, 7, 115, 116, 170, 180, 181, 182, 183, 187, 353; 432/180; 126/91 A

(56) References Cited

U.S. PATENT DOCUMENTS

| | | | | |
|---|---|---|---|---|
| 2,250,680 A | * | 7/1941 | Schlitt | 126/91 A |
| 2,398,611 A | * | 4/1946 | Beggs | 431/265 |
| 4,515,553 A | * | 5/1985 | Morimoto et al. | 431/8 |
| 4,945,841 A | * | 8/1990 | Nakamachi et al. | 431/180 |
| 5,145,361 A | * | 9/1992 | Kurzinski | 431/10 |
| 5,263,849 A | * | 11/1993 | Irwin et al. | 431/10 |
| 5,407,345 A | * | 4/1995 | Robertson et al. | 431/115 |
| 5,743,723 A | * | 4/1998 | Iatrides et al. | 431/181 |
| 6,027,333 A | * | 2/2000 | Fujii et al. | 431/215 |
| 6,471,508 B1 | * | 10/2002 | Finke et al. | 431/215 |

FOREIGN PATENT DOCUMENTS

| | | | |
|---|---|---|---|
| EP | 0 040 526 A2 | * | 11/1981 |
| WO | WO 96/09496 | * | 3/1996 |

* cited by examiner

*Primary Examiner*—Josiah Cocks
(74) *Attorney, Agent, or Firm*—Webb Ziesenheim Logsdon Orkin & Hanson, P.C.

(57) ABSTRACT

A burner for non-symmetrical combustion generally includes a burner housing enclosing a burner plenum. A fuel conduit extends within the housing and is positioned coaxial with a line spaced from a central axis of the burner. The fuel conduit defines a fuel exit opening. A baffle defining an air conduit extends longitudinally within the housing. The air conduit has an air opening on an opposite side of the burner central axis from the fuel exit opening. At least one oxygen injection lance extends longitudinally within the housing and partially through the air conduit. A burner port block is located adjacent to the baffle and downstream of the air opening, and is in fluid communication with the fuel conduit and the air conduit.

29 Claims, 4 Drawing Sheets

BURNER FOR NON-SYMMETRICAL COMBUSTION AND METHOD

CROSS-REFERENCE TO RELATED APPLICATION

This application is a continuation-in-part of U.S. application Ser. No. 09/744,845, filed Aug. 29, 2001, which claims the benefit of U.S. Provisional Application Serial No. 60/094,607, filed Jul. 30, 1998.

BACKGROUND OF THE INVENTION

1. Field of the Invention

This invention relates to industrial burners and, more particularly, forced draft and regenerative burners that minimize NOx emissions.

2. Description of the Prior Art

Conventional industrial burners are typically configured in a symmetrical fashion. In this symmetrical configuration, a fuel conduit is generally disposed axially along a centerline of the burner and combustion air is generally introduced immediately about a periphery of the fuel conduit or with appropriate air ducting symmetrically about the fuel conduit and radially spaced therefrom. A prior art example of a symmetrical industrial burner is disclosed by U.S. Pat. No. 3,876,362 to Hirose. The symmetrical or axial burner disclosed by the Hirose patent attempts to induce a deflected stream of gas from the burner by providing an air inlet in the burner tile structure. The positive axial mass flux of the air and fuel jets causes a recirculation of products of combustion (POC) from the furnace chamber into the burner tile. This induction of POC into the burner tile and subsequent entrainment into the fuel and air streams causes lower flame temperatures and lower NOx production rates.

An object of the present invention is to provide a burner having reduced NOx emissions. It is a further object of the present invention to provide a burner configuration that maximizes air and fuel entrainment with products of combustion (POC) thereby minimizing NOx formation. It is a specific object of the present invention to provide an oxygen-enriched burner that does not increase NOx emissions, and does not require high-purity source oxygen to achieve low NOx emissions.

SUMMARY OF THE INVENTION

The above objects are accomplished with a burner for non-symmetrical combustion made in accordance with the present invention. The burner generally includes a burner housing enclosing a burner plenum. A fuel conduit extends longitudinally within the housing and is positioned coaxial with a line spaced from a central axis of the burner. The fuel conduit defines a fuel exit opening. A baffle defining an air conduit extends longitudinally within the housing. The air conduit has an air opening on an opposite side of the burner central axis from the fuel exit opening. The air opening may be positioned a greater distance away from the burner central axis then the fuel exit opening. At least one oxygen injection lance extends longitudinally within the housing and partially through the air conduit. A burner port block is located adjacent to the baffle and downstream of the air opening and is in fluid communication with the fuel conduit and the air conduit.

The burner port block may have a sidewall diverging downstream of the air opening, and which may diverge at a flare angle of between approximately 2 and 30 The sidewall of the burner port block may diverge from the burner central axis at a flare angle of between approximately 2° and 30°. The air conduit may have a cross-sectional shape in the form of a segment of a circle defined by a chord. The burner may include a plurality of oxygen injection lances symmetrically positioned within the chord-shaped air conduit.

The baffle may further define a primary stabilization cavity immediately adjacent the fuel exit opening. The cavity may be in fluid communication with the fuel conduit through the fuel exit opening. The cavity may be cylindrical-shaped and coaxial with the fuel conduit. A combustion gas conduit may extend through the burner plenum and be connected to the cavity. The burner plenum may be connected to a diverter valve configured to selectively admit combustion gas from the burner plenum into the combustion gas conduit. The fuel conduit may be positioned coaxially within the combustion gas conduit. The baffle preferably separates the burner port block from the burner plenum. The fuel conduit may be positioned coaxially within the combustion gas conduit. Swirl vanes may be positioned within the combustion gas conduit and be peripherally spaced around the fuel conduit.

The burner may further include an auxiliary fuel conduit extending longitudinally through the burner plenum and connected to the burner port block. The auxiliary fuel conduit may define an auxiliary fuel exit opening radially spaced from the fuel exit opening and coterminous with the burner port block. The auxiliary fuel conduit may be positioned on the opposite side of the burner central axis from the air opening.

The present invention is also a method of non-symmetric combustion in the burner generally described hereinabove. In particular, the burner used in said method may include a fuel conduit coaxial with a first axis and defining a fuel exit opening. The burner may further include a baffle defining an air conduit having an air opening. The air conduit may be coaxial with a second axis. At least one oxygen injection lance may extend partially through the air conduit. A burner port block may be located adjacent to the baffle and downstream of the air opening and be in fluid communication with the fuel conduit and the air conduit. The burner port block may have a sidewall.

The method may include the steps of: injecting fuel along the first axis and out through the fuel exit opening, with the first axis spaced from a central axis of the burner; dispersing oxygen into combustion gas; discharging the combustion gas containing dispersed oxygen through the air conduit defining the air opening along the second axis, with the second axis positioned on an opposite side of the burner central axis from the first axis; inducing the combustion gas containing dispersed oxygen to flow toward the sidewall of the burner port block; mixing the combustion gas containing dispersed oxygen with the injected fuel; igniting the mixed combustion gas containing dispersed oxygen and injected fuel; and recirculating products of combustion into the discharging combustion gas containing dispersing oxygen.

The sidewall may diverge from the burner central axis, and the method may further comprise the step of inducing the combustion gas containing dispersed oxygen to flow in a diverging manner along the sidewall of the burner port block. The burner may further include an auxiliary fuel conduit coaxial with a third axis and defining an auxiliary fuel exit opening. The third axis may be radially spaced from the first axis, and the method may further comprise the step of injecting auxiliary fuel along the third axis and out through the auxiliary fuel exit opening in place of the step of injecting the fuel along the first axis.

The method may further comprise the step of dispersing the oxygen into the combustion gas through at least one oxygen injection lance extending at least partially into the air conduit. The air conduit may have a cross-sectional shape in the form of a segment of a circle defined by a chord. The at least one oxygen injection lance may include a plurality of oxygen injection lances symmetrically positioned within the air conduit, such that the step of dispersing the oxygen into the combustion gas through the plurality of oxygen injection lances results in a uniform dispersal of the oxygen into the combustion gas.

Further details and advantages of the present invention will become apparent from the following detailed description read in conjunction with the accompanying drawings, wherein like reference numerals designate like parts throughout.

DETAILED DESCRIPTION OF THE PREFERRED EMBODIMENTS

Figure 1:
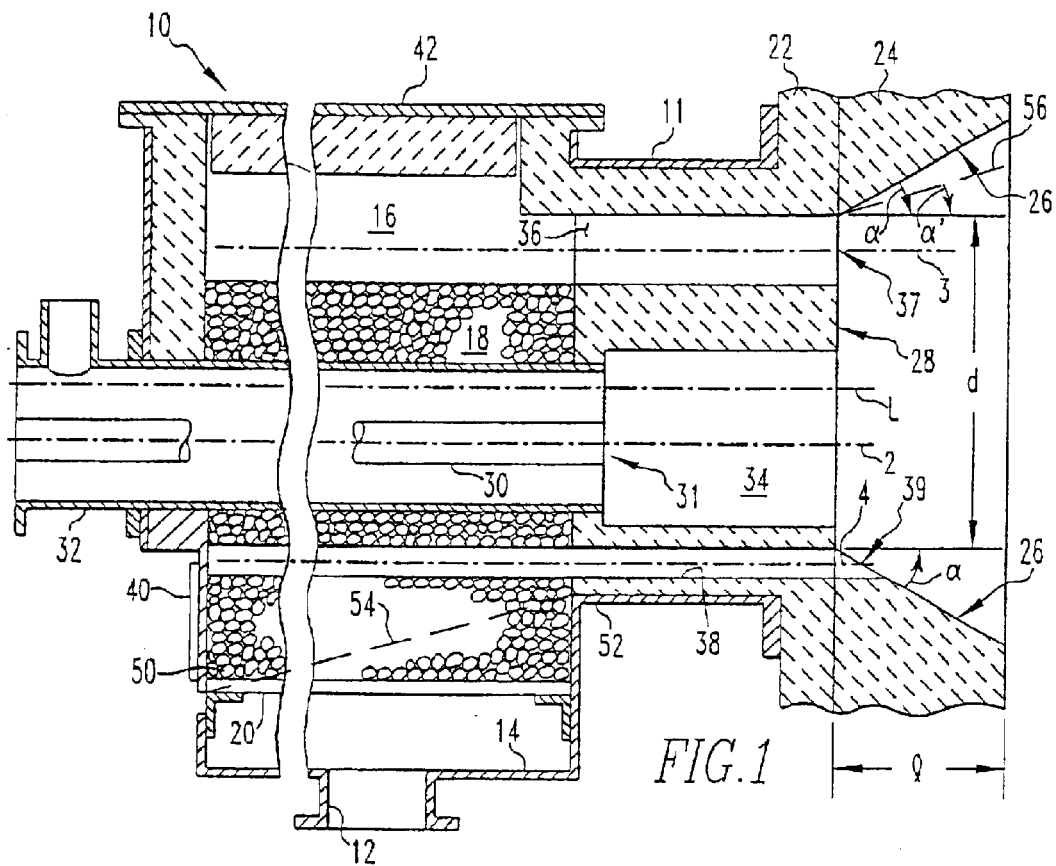
FIG. 1 is a cross-sectional view along a longitudinal axis of a regenerative burner for non-symmetrical combustion according to a first embodiment of the present invention.
Figure 2:
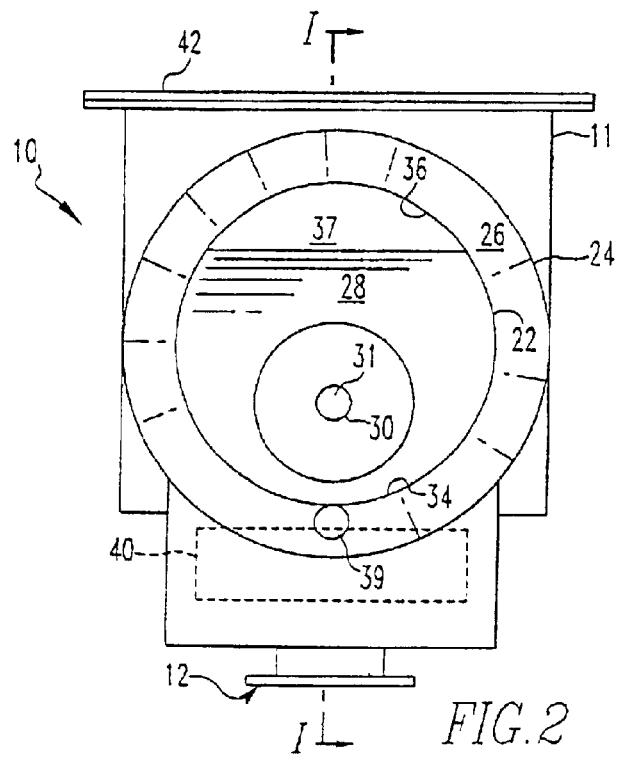
FIG. 2 is a front view of the burner of FIG. 1.

Referring to FIGS. 1 and 2, a regenerative burner 10 for non-symmetrical combustion according to a first embodiment of the present invention is shown. The burner 10 includes a burner housing 11. The burner housing 11 defines a primary air inlet 12 and encloses a burner plenum 14. The primary air inlet 12 is in fluid communication with the burner plenum 14. The plenum 14 has a freeboard 16 defined above a bed of regenerative media 18. The media bed 18 is positioned within the plenum 14 and at least partially fills the plenum 14. The media bed 18 rests on a screen grate 20 positioned within the plenum 14 opposite the primary air inlet 12.

A baffle 22 is generally positioned between the plenum 14 and a burner port block 24. The burner port block 24 is connected to the baffle 22. A sidewall 26 of the burner port block 24 has a predetermined flare angle α, preferably between approximately 2° and approximately 30°. The burner port block 24 has a linear thickness (l) and an inside diameter (d). Preferably, the ratio of the linear thickness to the inside diameter (l/d) is greater than or equal to 0.6 and less than or equal to 1.0. The baffle 22 further includes a baffle face 28.

The burner 10 has a geometric or burner centerline L. A fuel conduit 30 extends in a longitudinal direction within the burner housing 11 and is positioned coaxial with an offset centerline 2 relative to the geometric centerline L, giving the burner 10 a non-symmetric configuration, (i.e., the offset centerline or central axis 2 of the fuel conduit 30 is spaced a distance from the geometric centerline L of the burner 10). The fuel conduit 30 defines a fuel exit opening 31. The fuel conduit 30, in the embodiment shown in FIGS. 1 and 2, is nested within a combustion gas conduit 32. The conduit 32 is connected to an outside source for supplying combustion gas, such as air or fuel gas, as described further hereinafter.

The baffle 22 defines a primary stabilization cavity 34 immediately downstream of the fuel exit opening 31. The cavity 34 is in fluid communication with the fuel conduit 30 through the fuel exit opening 31. The conduit 32 extends through the burner plenum 14 and connects to the cavity 34. As shown in FIG. 1, the baffle 22 is concentrically positioned around the fuel conduit 30. The cavity 34 is preferably cylindrical-shaped and coaxial with the fuel conduit 30, but may also have tapered or concave sidewalls and be offset from the fuel conduit 30. The baffle 22 defines an air conduit 36 that extends into the burner housing 11 and connects to the burner plenum 14. The air conduit 36 defines an air opening 37. The air conduit 36 and the air opening 37 are positioned on an opposite side of the geometric centerline L from the fuel conduit 30 and the fuel exit opening 31. Preferably, the air conduit 36 and the air opening 37 are positioned a greater distance away from the geometric centerline L of the burner 10 than the fuel conduit 30 and the fuel exit opening 31. The air conduit 36 preferably has a cross-sectional shape in the form of a segment of a circle defined by a chord, as shown in FIG. 2, and includes a central axis 3. In addition, the fuel conduit 30 may be oriented parallel to, or diverge away from, the air conduit 36.

The burner 10 may be further equipped with an auxiliary fuel conduit 38. The auxiliary fuel conduit 38 defines an auxiliary fuel exit opening 39 to the burner port block 24. The auxiliary fuel conduit 38 extends through the burner plenum 14. As shown in FIG. 2, the auxiliary fuel conduit 38 and the auxiliary fuel exit opening 39 are radially spaced from the fuel conduit 30 and the fuel exit opening 31. The auxiliary fuel exit opening 39 is coterminous with the burner port block 24. In addition, the auxiliary fuel conduit 38 and the auxiliary fuel exit opening 39 are preferably positioned on the opposite side of the geometric centerline L from the air conduit 36 and the air opening 37 discussed previously. The auxiliary fuel conduit 38 includes a central axis 4 as shown in FIG. 1.

Figure 3:
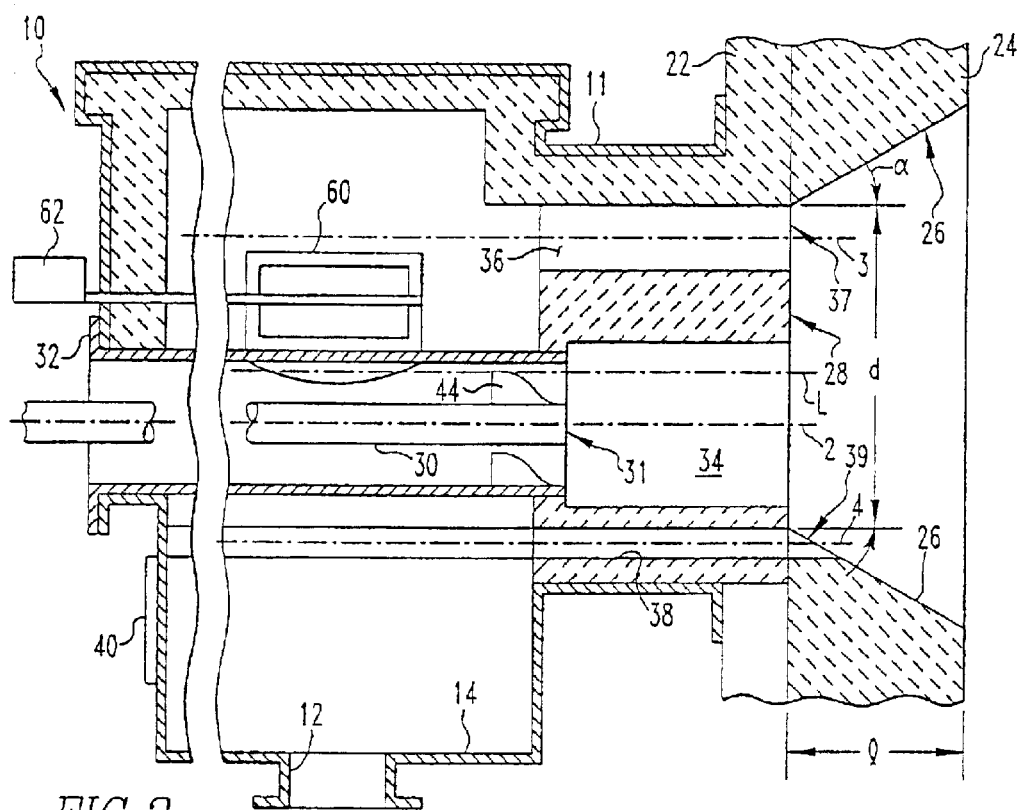
FIG. 3 is a cross-sectional view along a longitudinal axis of a recuperative burner for non-symmetrical combustion according to a second embodiment of the present invention.
Figure 5:
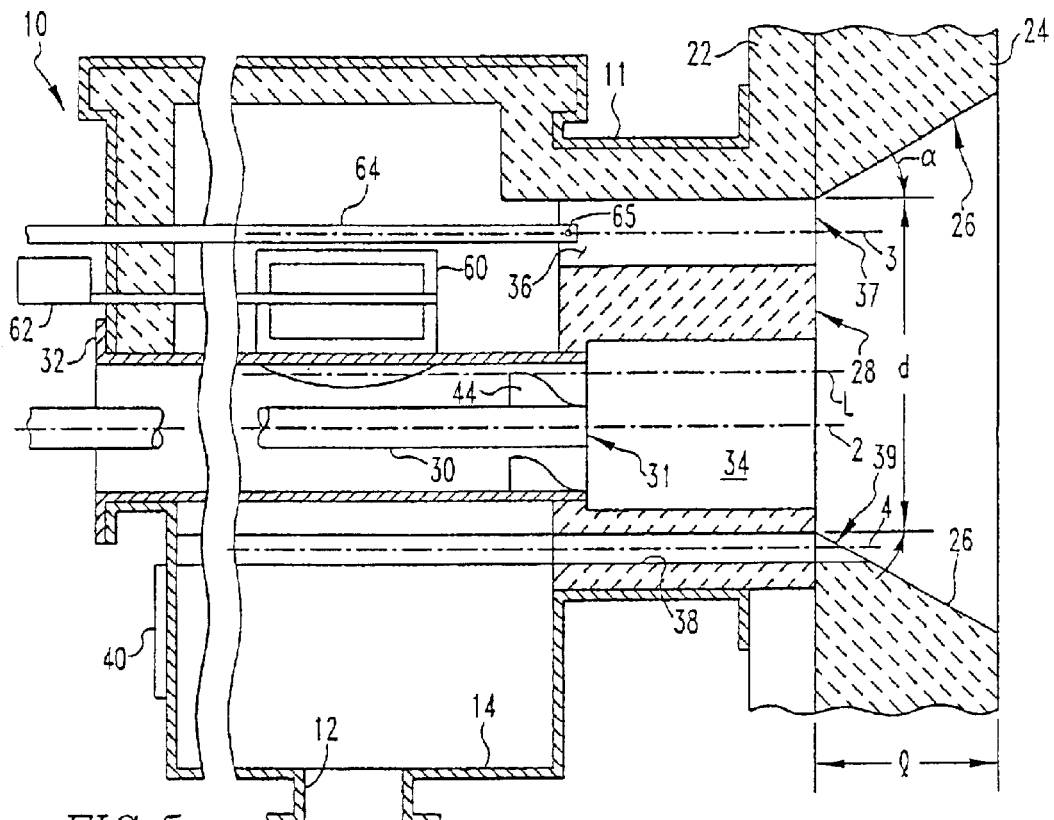
FIG. 5 is a cross-sectional view along a longitudinal axis of a recuperative burner for non-symmetrical combustion according to a fourth embodiment of the present invention and capable of oxygen-enriched combustion.

A cleanout door 40 is positioned in a lower portion of the burner 10 and opens into the media bed 18. A fill door 42 serves as the top section of the burner 10, creating access to the media bed 18 for filling and leveling of the media bed 18. The freeboard 16 is in fluid communication with the burner port block 24 through the air conduit 36 and the air opening 37. Swirl vanes 44 may be provided in the conduit 32 and be peripherally spaced about the fuel conduit 30, as shown in FIGS. 3 and 5 (discussed hereinafter). However, the swirl vanes 44 are optional in the embodiments of the invention shown in FIGS. 1, 3, and 5.

In operation, combustion air enters the primary air inlet 12 and expands slightly in the burner plenum 14 for distribution through the screen grate 20. The combustion air then propagates through the media bed 18 and flows into the freeboard 16. Fuel is introduced through the fuel conduit 30 at a velocity of between about 400 and 1200 feet per second at rated input and exits the fuel exit opening 31 along the central axis 2 of the fuel conduit 30, or first axis. The combustion air is accelerated through the air conduit 36 to a velocity greater than 250 feet per second and exits the air opening 37 along the central axis 3 of the air conduit 36, or second axis. The combustion air velocity in the burner plenum 14 will be on the order of 40–60 feet per second, and in the freeboard 16 on the order of 60–80 feet per second at rated input.

The combustion air discharges as an air jet from the air opening 37 at the baffle face 28 into the burner port block 24. The airjet will, by Coanda Effect, tend toward the sidewall 26 of the burner port block 24 at approximately the flare angle α. The discharging air jet and the fuel exiting the fuel exit opening 31 are then mixed in the opening defined by the burner port block 24 and ignited. Products of combustion from the combustion process, which have been partially cooled by giving up heat in the process, are recirculated back into the air jet discharging from the air opening 37 and into the void generated by the remaining blockage of the baffle 22. The main combustion air exiting the air opening 37 is vitiated by the recirculated products of combustion.

As stated previously, the air conduit 36 preferably has a cross-sectional shape in the form of a segment of a circle defined by a chord, as shown in FIG. 2. Hence, the air opening 37 also defines such a shape. The baffle 22 acts as a dam to retain the media bed 18 in place within the burner plenum 14 in the housing 11 of the burner 10. The chord geometry of the air opening 37 is advantageous in that it exposes the optimum amount of combustion air flow to the sidewall 26 of the burner port block 24, thus optimizing the benefits of the Coanda Effect. The sizing of the chord and, hence, the circle segment will depend on the parameters of the system in which the burner 10 is to be utilized, with the main design criteria being that the chord must be located appropriately to obtain a velocity for the combustion air of 250 feet per second or more through the air opening 37 into the burner port block 24.

An important feature of the present invention is that the fuel conduit 30 and the auxiliary fuel conduit 38 are, in operation, mutually exclusive. That is, although the burner 10 may be constructed with both, only one of the fuel conduit 30 and the auxiliary fuel conduit 38 is to be utilized at any one time. When the auxiliary fuel conduit 38 is used, the fuel is injected into the opening defined by the burner port block 24 along the central axis 4 of the auxiliary fuel conduit 38, or third axis.

In a cold startup situation of the burner 10, which occurs when the furnace temperature is less than 1600° F., a portion of the combustion air is delivered through the conduit 32, either axially or through the swirl vanes 44 (shown in FIGS. 3 and 5). Thus, a portion of the combustion air is delivered concentrically around the fuel jet injected from the fuel exit opening 31, and substantially parallel thereto. As stated previously, the swirl vanes 44 are optional in the burners 10 of FIGS. 1 and 3. The combustion air would then pass from the swirl vanes 44 into the primary stabilization cavity 34. Fuel is introduced through the fuel conduit 30 at a high velocity, preferably greater than 500 feet per second. As stated previously, the fuel conduit 30 may be parallel to, or it may be diverted away from, the air conduit 36. The divergent arrangement will increase the delay for mixing of the burner fuel and the combustion air.

After the furnace warms up to a temperature greater than 1600° F., the combustion air delivered to the conduit 32 is throttled back to less than 5% of the stoichiometric requirement. The high velocity fuel conduit 30 produces negative pressure regions in the cavity 34, with the resulting flue gasses being drawn back into the cavity 34 and vitiating the fuel jet prior to initiating combustion in the region of the burner port block 24. As mentioned previously, the main combustion air exiting the air opening 37 is also vitiated by recirculating products of combustion. It should be noted that the primary combustion air entering the conduit 32 in the burner 10 of FIG. 1, during cold startup, is not preheated.

Other features of the present invention shown in FIGS. 1 and 2 will now be discussed. When the mass velocity through the plenum 14 is high enough to fluidize the media bed 18, larger, heavier media bed elements may be placed in the upper portion of the plenum 14 to contain the media bed 18 and to prevent its fluidization. In addition, the screen grate 20 shown in FIG. 1 may be inclined at an angle between connecting points 50 and 52 to further reduce the size of the burner 10. This particular variation is represented by dashed line 54 in FIG. 1. The cleanout door 40 located adjacent the media bed 18 is in a low temperature region of the burner 10 and, consequently, does not require lining. The freeboard 16 advantageously permits the air exiting the media bed 18 to equalize prior to being accelerated through the air conduit 36. Conversely, the burner 10, when in its exhausting cycle, will have products of combustion firing back through the air opening 37 and the air conduit 36 into the freeboard 16 for equalization and penetration across the media bed 18.

The burner construction shown in FIGS. 1 and 2 is advantageous in that the conduit 32 and the fuel conduit 30 are positioned inside the regenerative media bed 18. Consequently, the conduit 32 and the fuel conduit 30 are not exposed to high temperature products of combustion during the exhausting cycle or to high air temperatures during the firing cycle of the burner 10. Therefore, these elements do not require insulation. The conduit 32 and the fuel conduit 30 are insulated by the media bed 18.

With the fuel introduced along the offset centerline 2 compared to the geometric centerline L, the inventors have achieved test results suggesting that NOx emission levels may be reduced to approximately 25% of the levels achieved by burners having the fuel conduit located coaxial with the burner centerline and having two air slots symmetrically arranged about the fuel conduit. The preferred ratio of the linear thickness (1) between the baffle face 28 and the hot face of the burner port block 24 compared to the inside diameter (d) of the opening in the burner port block 24 at its upstream end should be equal to or less than 1, i.e., 1/d 1.0. This assures that recirculated products of combustion have been sufficiently cooled prior to coming into contact with the combustion air and the fuel gas. Additionally, this moves the combustion reaction farther away from the burner tile structure, reducing the generation of radiant heat.

A further variation of the present invention also shown in FIGS. 1 and 2 would be to construct the burner port block 24 so that the flare angle a at the upper portion of the burner port block 24 near the air opening 37 is less than the flare angle a at the lower end of the burner port block 24 closer to the fuel conduit 30 and the auxiliary fuel exit opening 39. This will assist in better recirculating the products of combustion to the fuel jet exiting the fuel exit opening 31 or the auxiliary fuel exit opening 39. The reduced flare angle a near the air opening 37 is shown in FIG. 1 by dashed line 56 and is indicated by angle "α'". When utilizing the auxiliary fuel conduit 38, the auxiliary fuel conduit 38 could be disposed axially or convergent up to an angle of 0 to $-\alpha°$. The disposition of the auxiliary fuel conduit 38 depends on the desired location for initiating mixing of the fuel gas with the combustion air in the opening of the burner port block 24 and into the combustion furnace.

Referring now to FIG. 3, a recuperative version of the burner 10 is shown, which is similar to the regenerative version discussed hereinabove. In this embodiment, the media bed 18 is removed and a diverter valve 60 installed in the burner plenum 14, providing a connection between the interior of the conduit 32 and the burner plenum 14 for selective introduction of combustion gas, such as air, into the conduit 32. The diverter valve 60 may be controlled by a motor 62. Combustion air enters the air inlet 12 from an external recuperator (not shown), the details of which are well-known to those skilled in the art. The diverter valve 60 is open only during the cold startup phase (i.e., furnace temperature less than 1600° F.). Clearances around the diverter valve 60 permit a predetermined amount of leakage which supplies approximately up to 10% of the stoichiometric requirement of the combustion air through the conduit 32 when the diverter valve 60 is closed. In the recuperative version of the burner 10, the primary air, the air entering the cavity 34, and the secondary air passing through the air opening 37 are preheated. The swirl vanes 44 are also optional in this embodiment of the burner 10, as stated previously.

As will be apparent to those skilled in the art, the present invention is equally applicable to both recuperative and regenerative applications. Whether a user chooses the recuperative or regenerative version depends, in large part, on the space restrictions for the furnace with which the burner 10 is to be used. The recuperative version generally requires less space than the regenerative version.

The air velocity is maintained greater than or equal to 250 feet per second throughout at rated input. Once the temperature in the furnace exceeds 1600° F., the fuel gas supply through the conduit 32 is shut off. All of the stoichiometric fuel gas then exits the fuel conduit 30 at a speed greater than 500 feet per second at rated input.

Figure 4:
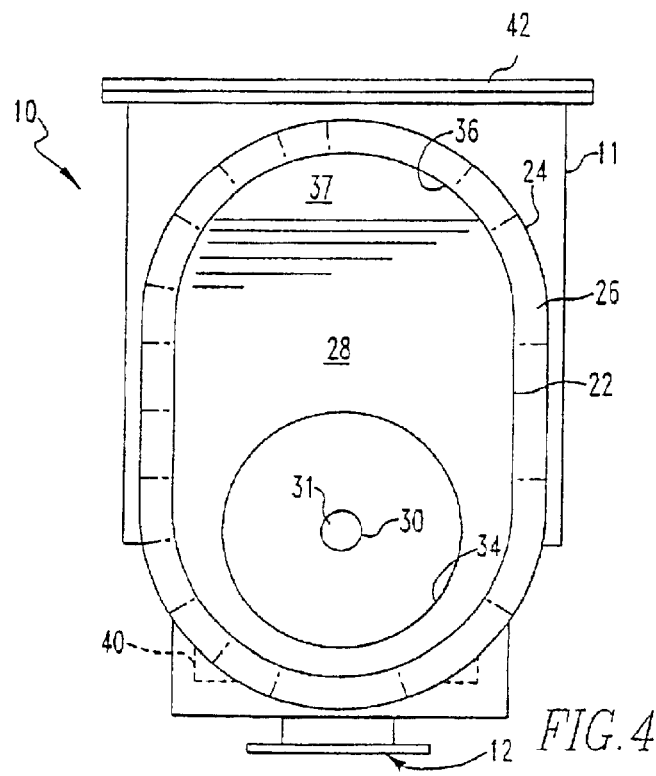
FIG. 4 is a front view of a burner for non-symmetrical combustion having an elongated burner port block according to a third embodiment of the present invention.

FIG. 4 shows a third embodiment of the burner 10. The burner 10 shown in FIG. 4 has an elongated burner port block 24. This configuration provides further separation between the fuel exit opening 31 and the air opening 37. The increased separation permits additional furnace flue gas to recirculate back into the area between the fuel jet exiting the fuel exit opening 31 and the air stream exiting the air opening 37. Combustion is started inside the furnace wall in a traditional manner and the burner 10 shown in FIG. 4 operates in an otherwise similar manner to the burners 10 discussed hereinabove. Testing of the configuration shown in FIG. 4 indicates that an angle on the fuel jet 31 away from the air jet at between about 3° and 10° facilitates a lower NOx production than having the fuel parallel to the air jet stream.

The inventors have tested the recuperative version of the burner 10 shown in FIG. 3. A table of actual test results follows:

TABLE 1

| α | l/d | Air preheat temperature (degrees F.) | Furnace temperature (degrees F.) | NOx (ppm) |
|---|---|---|---|---|
| 30° | 1 | 800° | 2400° | 25 |
| 2.8° | 1 | 800° | 2400° | 55 |
| TRADITIONAL | 1 | 800° | 2400° | 110 |

Table 1 shows that, with the flare angle α at 2.8°, a 50% reduction in NOx was observed compared to symmetrical combustion with a burner having a fuel jet disposed axially along the centerline of the burner and with two symmetrical air jets radially spaced from the fuel jet in the traditional configuration. Furthermore, when the flare angle α was equal to 30°, a 75% reduction in NOx compared to the same type of symmetrical or "axial" burner was realized. The results for a traditional approach using a traditional configuration are shown in Table 1 for comparison.

The configuration of the air opening 37 in the form of a circle segment defined by a chord is advantageous for two additional reasons. First, this configuration is easier to mold in the baffle 22. Second, the chord configuration provides a better dam for the elements in the media bed 18 in the regenerative version of the invention.

Figure 6:
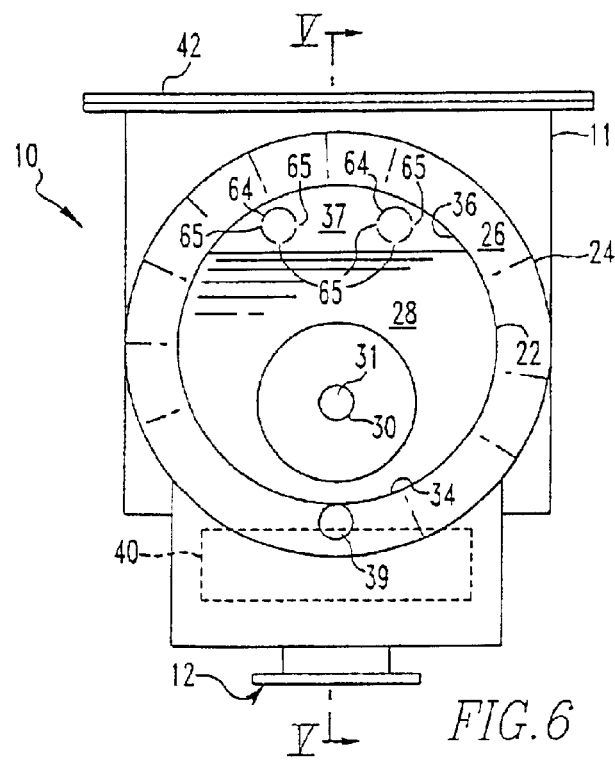
FIG. 6 is a front view of the burner of FIG. 5.

Referring to FIGS. 5 and 6, a fourth embodiment of the burner 10 is shown. The burner 10 of FIGS. 5 and 6 is an oxygen-enriched embodiment of the present invention. The burner of FIGS. 5 and 6 is shown as the recuperative version, but the details discussed hereinafter are equally applicable to the regenerative burner 10 discussed previously in connection with FIGS. 1 and 2. The burner 10 of FIGS. 5 and 6 incorporates the concept of injecting oxygen into the secondary air conduit (i.e., air conduit 36), thereby providing an oxygen-enriched burner.

The oxygen-enriched burner 10 of FIGS. 5 and 6 is substantially identical to the recuperative burner 10 shown in FIG. 3, but now further includes at least one and, preferably, a plurality of oxygen injection lances 64. The oxygen injection lances 64 extend in a longitudinal direction within the burner housing 11. The oxygen injection lances 64 extend at least partially into the air conduit 36 defined by the baffle 22. Preferably, the oxygen injection lances 64 extend parallel to the central axis 3 of the air conduit 36. The oxygen injection lances 64 are preferably symmetrically positioned within the air conduit 36, as shown in FIG. 6. The oxygen injection lances 64 extend into the air conduit 36 only as far as necessary so that as oxygen is injected into the combustion air within the air conduit 36, the additional oxygen is uniformly dispersed in the combustion air prior to exiting the baffle 22 through the air opening 37. Thus, a dispersed mix of air and oxygen (i.e., combustion gas) is dispersed through the air opening 37 of the air conduit 36 during operation of the burner 10. The oxygen injection lances 64 define a plurality of openings 65 for dispersing oxygen into the combustion air in the air conduit 36. The openings 65 are sized and positioned to yield uniform dispersal of oxygen into the combustion air. The sizing and positioning of the openings 65 are preferably non-symmetrical due to the geometry (i.e., chord shape) of the air conduit 36. However, the openings may also be symmetrically arranged.

As stated, the oxygen injection lances 64 are positioned to uniformly disperse oxygen into the combustion air passing though the air conduit 36. A dispersed mixture of oxygen and combustion air exits through the air opening 37 and into the burner port block 24. Once exiting the air opening 37, operation of the oxygen-enriched burner 10 of FIGS. 5 and 6 is substantially similar to the operation of the regenerative burner 10 discussed previously. The use of the oxygen injection lances 64 in the burner 10 provides the benefits of an oxygen-enriched air combustion atmosphere, without the usual drawbacks of increased NOx as will be appreciated by those skilled in the art. One of the known drawbacks to oxygen-enriched combustion is the problem of NOx emissions when the oxygen content of the combustion air stream is increased above the normal 20.9% in ambient air. As the oxygen content of a combustion stream increases above this amount, thermal NOx emissions increase substantially due to increased flame temperature as well as increased oxygen available for the NOx formation reactions. But it also is well-known that oxygen-enriched combustion has numerous benefits. For example, an oxygen-enriched combustion system may be used to boost furnace throughput by judicious use of oxygen during certain parts of a heating cycle, without requiring the expensive oxygen when thermal input demands are reduced. The present oxygen-enriched burner 10 provides the beneficial aspects of oxygen-enriched combustion, without the negative drawbacks of increased NOx emissions.

Figure 7:
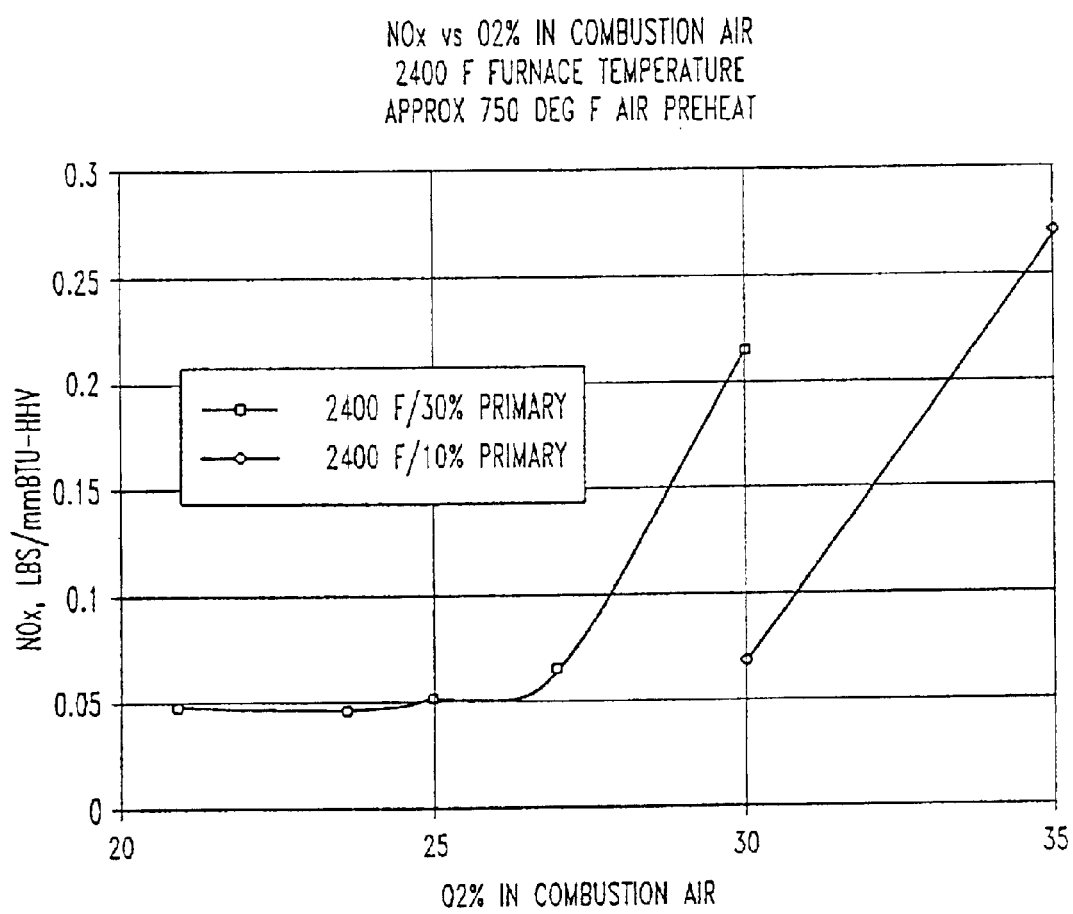
FIG. 7 is a graph of NOx emissions vs. $O_2$% in combustion air during operation of the burner of FIG. 5.

FIG. 7 illustrates the improvement in NOx emissions provided by the oxygen-enriched burner 10 of FIGS. 5 and 6. The inventors have tested the oxygen-enriched burner of FIGS. 5 and 6 having two oxygen injection lances 64. As shown in FIG. 7, the burner 10 maintains low NOx emissions at least up to 27–30% $O_2$, which represents a substantial increase in fuel efficiency and/or throughput. The data represented in FIG. 7 illustrates that the method described herein avoids the elevated thermal NOx generation typically observed at high flame temperatures. The dispersed oxygen in accordance with the present invention maintains flame temperature below the level where the thermal NOx generation begins to rapidly increase. This level is known as the Zeldovich reaction mechanism.

The oxygen injection lances 64 used in connection with the burner 10 provide additional secondary advantages as well. Because the oxygen is uniformly dispersed in the combustion air in the air conduit 36 (i.e., within the burner 10 itself), the burner 10 does not require a high purity source of oxygen to achieve the performance discussed previously. Also, the oxygen-enriched burner 10 avoids the need for special piping construction for oxygen service and for the primary air inlet 12 and associated upstream piping, which will reduce the overall cost for a furnace utilizing the burner 10. Additionally, in the event of failure or disruption of the oxygen supply to the oxygen injection lances 64, the burner 10 can operate in an air/fuel mode.

The embodiment of the burner 10 shown in FIGS. 5 and 6 provides the advantages of oxygen-enriched combustion without the problem of increased NOx emissions. A substantial flow of oxygen may be provided in the combustion air in the air conduit 36 without increasing NOx emissions. Further, the oxygen used in the burner 10 need not be a high purity source as is typically required by prior art oxygen-enriched burners.

Further variations and modifications of the above-described invention may be made without departing from the spirit and scope of the present invention. The scope of the present invention is defined by the appended claims and equivalents thereto.

What is claimed is:

1. A burner for non-symmetrical combustion, comprising:
   a burner housing enclosing a burner plenum;
   a fuel conduit extending longitudinally within the housing and positioned coaxial with a line spaced from a central axis of the burner, with the fuel conduit defining a fuel exit opening;
   a baffle defining an air conduit extending longitudinally within the housing, with the air conduit terminating in an air opening on an opposite side of the burner central axis from the fuel exit opening wherein the air conduit has a cross-sectional share in the form of a segment of a circle defined by a chord and further wherein the entire cross-sectional area of the air opening is positioned on said opposite side of the burner axis;
   at least one oxygen injection lance extending longitudinally within the housing and at least partially through the air conduit; and
   a burner port block adjacent to the baffle and downstream of the air opening and in fluid communication with the fuel conduit and the air conduit.

2. The burner of claim 1, wherein the burner port block has a sidewall diverging downstream of the air opening.

3. The burner of claim 2, wherein the sidewall of the burner port block diverges at a flare angle of between approximately 2° and 30°.

4. The burner of claim 2, wherein the sidewall of the burner port block diverges from the burner central axis at the flare angle of between approximately 2° and 30°.

5. The burner of claim 1, wherein the burner includes a plurality of oxygen injection lances symmetrically positioned within the chord-shaped air conduit.

6. The burner of claim 1, wherein the baffle further defines a primary stabilization cavity immediately adjacent the fuel exit opening, with the cavity in fluid communication with the fuel conduit via the fuel exit opening.

7. The burner of claim 6, wherein the cavity is cylindrical-shaped and coaxial with the fuel conduit.

8. The burner of claim 6, further comprising a combustion gas conduit extending through the burner plenum and connected to the cavity, and wherein the burner plenum is connected to a diverter valve configured to selectively admit combustion gas from the burner plenum into the combustion gas conduit.

9. The burner of claim 6, further comprising a combustion gas conduit extending through the burner plenum and connected to the cavity, wherein the baffle separates the burner port block from the burner plenum, and wherein the fuel conduit is positioned coaxially within the combustion gas conduit.

10. The burner of claim 9, wherein the burner plenum is connected to a diverter valve configured to selectively admit combustion gas into the combustion gas conduit.

11. The burner of claim 9, further comprising swirl vanes positioned within the combustion gas conduit and peripherally spaced around the fuel conduit.

12. The burner of claim 1, further comprising an auxiliary fuel conduit extending longitudinally through the burner plenum and connected to the burner port block, with the auxiliary fuel conduit defining an auxiliary fuel exit opening radially spaced from the fuel exit opening and coterminous with the burner port block.

13. The burner of claim 12, wherein the auxiliary fuel exit opening is positioned on the opposite side of the burner central axis from the air opening.

14. A burner for non-symmetrical combustion, comprising:
   a burner housing enclosing a burner plenum;
   a fuel conduit extending longitudinally within the housing and positioned coaxial with a line spaced from a central axis of the burner, with the fuel conduit defining a fuel exit opening;
   a baffle defining an air conduit extending longitudinally within the housing, with the air conduit having an air opening, said air opening having its entire cross-sectional area located on an opposite side of the burner central axis from the fuel exit opening, with the air opening positioned a greater distance away from the burner central axis than the fuel exit opening;
   at least one oxygen injection lance extending longitudinally within the housing and at least partially through the air conduit; and
   a burner port block adjacent to the baffle and downstream of the air opening and in fluid communication with the fuel conduit and the air conduit, with the burner port block having a sidewall diverging downstream of the air opening.

15. The burner of claim 14, wherein the sidewall of the burner port block diverges from the burner central axis at a flare angle of between approximately 2° and 30°.

16. The burner of claim 14, wherein the air conduit has a cross-sectional shape in the form of a segment of a circle defined by a chord.

17. The burner of claim 16, wherein the burner includes a plurality of oxygen injection lances symmetrically positioned within the chord-shaped air conduit.

18. The burner of claim 14, wherein the baffle further defines a primary stabilization cavity immediately adjacent the fuel exit opening, with the cavity in fluid communication with the fuel conduit via the fuel exit opening.

19. The burner of claim 18, wherein the cavity is cylindrical-shaped and coaxial with the fuel conduit.

20. The burner of claim 18, further comprising a combustion gas conduit extending through the burner plenum and connected to the cavity, and wherein the burner plenum is connected to a diverter valve configured to selectively admit combustion gas from the burner plenum into the combustion gas conduit.

21. The burner of claim 18, further comprising a combustion gas conduit extending through the burner plenum and connected to the cavity, wherein the baffle separates the burner port block from the burner plenum, and wherein the fuel conduit is positioned coaxially within the combustion gas conduit.

22. The burner of claim 21, wherein the burner plenum is connected to a diverter valve configured to selectively admit combustion gas into the combustion gas conduit.

23. The burner of claim 21, further comprising swirl vanes positioned within the combustion gas conduit and peripherally spaced around the fuel conduit.

24. The burner of claim 14, further comprising an auxiliary fuel conduit extending longitudinally through the burner plenum and connected to the burner port block, with the auxiliary fuel conduit defining an auxiliary fuel exit opening radially spaced from the fuel exit opening and coterminous with the burner port block, wherein the auxiliary fuel exit opening is positioned on the opposite side of the burner central axis from the air opening.

25. A method of non-symmetric combustion in a burner, comprising the steps of:

injecting fuel along a first axis and out through a fuel exit opening, with the first axis spaced from a central axis of the burner;

dispersing oxygen into combustion gas;

discharging the combustion gas containing dispersed oxygen through an air conduit having an air opening along a second axis, with the second axis positioned on an opposite side of the burner central axis from the first axis, the air opening having its entire cross-sectional area on said opposite side of the burner central axis;

inducing the combustion gas containing dispersed oxygen to flow toward a sidewall of a burner port block;

vitiating the combustion gas containing dispersed oxygen with recirculated products of combustion, upon exiting the air opening;

mixing the combustion gas containing dispersed oxygen with the injected fuel; and igniting the mixed combustion gas containing dispersed oxygen and injected fuel;

26. The method of claim 25, wherein the sidewall diverges from the burner central axis, and the method further comprises the step of inducing the combustion gas containing dispersed oxygen to flow in a diverging manner along the sidewall of the burner port block.

27. The method of claim 25, wherein the burner further comprises an auxiliary fuel conduit coaxial with a third axis and defining an auxiliary fuel exit opening, with the third axis radially spaced from the first axis, and the method further comprising the step of injecting auxiliary fuel along the third axis and out through the auxiliary fuel exit opening in place of the step of injecting the fuel along the first axis.

28. The method of claim 25, further comprising the step of dispersing the oxygen into the combustion gas through at least one oxygen injection lance extending at least partially into the air conduit.

29. The method of claim 28, wherein the air conduit has a cross-sectional shape in the form of a segment of a circle defined by a chord and the at least one oxygen injection lance includes a plurality of oxygen injection lances symmetrically positioned within the air conduit such that the step of dispersing the oxygen into the combustion gas through the plurality of oxygen injection lances results in a uniform dispersal of the oxygen into the combustion gas.

* * * * *

UNITED STATES PATENT AND TRADEMARK OFFICE
CERTIFICATE OF CORRECTION

PATENT NO. : 6,793,486 B2
DATED : September 21, 2004
INVENTOR(S) : Finke et al.

It is certified that error appears in the above-identified patent and that said Letters Patent is hereby corrected as shown below:

Column 1,
Line 7, after "August 29, 2001", insert -- now U.S. Patent No. 6,471,508, --

Column 9,
Line 61, "share in the form" should read -- shape in the form --

Signed and Sealed this

Twelfth Day of April, 2005

JON W. DUDAS
*Director of the United States Patent and Trademark Office*